US011654580B2

(12) United States Patent
Elmar

(10) Patent No.: US 11,654,580 B2
(45) Date of Patent: May 23, 2023

(54) GRIPPER ARM, GRIPPING DEVICE AS WELL AS TRANSPORT DEVICE FOR GRIPPING, HOLDING AND GUIDING IN PARTICULAR BOTTLE-LIKE CONTAINERS

(71) Applicant: TYROLON-SCHULNIG GMBH, Hochfilzen (AT)

(72) Inventor: Schulnig Elmar, St. Jakob i.H. (AT)

(73) Assignee: TYROLON-SCHULNIG GMBH, Hochfilzen (AT)

( * ) Notice: Subject to any disclaimer, the term of this patent is extended or adjusted under 35 U.S.C. 154(b) by 345 days.

(21) Appl. No.: 17/068,222

(22) Filed: Oct. 12, 2020

(65) Prior Publication Data
US 2021/0129350 A1 May 6, 2021

(30) Foreign Application Priority Data
Oct. 30, 2019 (EP) ..................... 19206178

(51) Int. Cl.
  *B25J 15/00* (2006.01)
  *B25J 15/02* (2006.01)
  *B65G 47/86* (2006.01)
  *B65G 47/90* (2006.01)
(52) U.S. Cl.
  CPC ....... *B25J 15/0028* (2013.01); *B25J 15/0246* (2013.01); *B65G 47/847* (2013.01); *B65G 47/90* (2013.01); *B65G 2201/0244* (2013.01)

(58) Field of Classification Search
CPC . B25J 15/0028; B25J 15/0246; B65G 47/847; B65G 47/90; B65G 2201/0244
See application file for complete search history.

(56) References Cited

U.S. PATENT DOCUMENTS

2011/0180374 A1* 7/2011 Fahldieck ............ B65G 47/847
294/198

FOREIGN PATENT DOCUMENTS

| DE | 102014107538 B3 | * | 9/2015 | .......... B65G 47/847 |
| DE | 102014111564 A1 | * | 2/2016 | ............ B65G 47/90 |
| DE | 102017108930 A1 | * | 10/2018 | |
| EP | 3165482 A1 | | 5/2017 | |
| JP | H0725454 A | | 1/1995 | |
| WO | 2018108248 A1 | | 6/2018 | |

* cited by examiner

*Primary Examiner* — Stephen A Vu
(74) *Attorney, Agent, or Firm* — Shumaker, Loop & Kendrick, LLP; James D. Miller

(57) ABSTRACT

A gripper arm for a gripping device for gripping, holding and guiding in particular bottle-like containers which includes a base body and a gripping section arranged on the base body, wherein the gripping section is pivotably mounted about a pivot axis in and against a direction of pivoting. At least one limiting means for limiting a pivoting range of the gripping section and at least one resetting means is provided for returning the pivoted gripping section into a vertical position. Further provided are a gripping device as well as a transport device.

17 Claims, 3 Drawing Sheets

GRIPPER ARM, GRIPPING DEVICE AS WELL AS TRANSPORT DEVICE FOR GRIPPING, HOLDING AND GUIDING IN PARTICULAR BOTTLE-LIKE CONTAINERS

CROSS-REFERENCE TO RELATED APPLICATION

This patent application is a U.S. Utility Patent Application which claims priority to European Patent Application No. 19 206 178.6 filed Oct. 30, 2019, the entire disclosure of which is hereby incorporated herein by reference.

FIELD OF THE INVENTION

The invention relates to a gripper arm, a gripping device as well as a transport device for gripping, holding and guiding in particular bottle-like containers.

BACKGROUND OF THE INVENTION

Gripping devices for gripping, holding and/or guiding in particular substantially round containers are already known from the prior art and are used in the production line processing of containers. To be understood by the term "container" in the context of the present invention is in particular, albeit not exclusively, containers having a substantially circular cross section, e.g. bottles, cans or glassware, which can consist of glass, metal or plastic according to the respective requirements. The term "substantially round" in the context of the present invention does not refer to round containers in the geometric sense exclusively, but also to e.g. oval, regularly polygonal, etc. ones which in particular exhibit a substantially circular, but for example also oval or polygonal cross section.

When being cleaned, filled or sealed, the containers are usually grasped at an entry point station by means of a gripping device having at least one pair of gripper arms and then transported to the next station within the process. Such a gripping device for a container transport system typically has at least two gripper arms and can switch between a gripping position and an open position. In order to transport a container, the gripper arms normally grasp below the neck collar or—in the case of bottles or other elongated containers—around the mid-section of the container.

A control cam thereby functions as an opening means and e.g. a coil spring as closing means for the gripping device. When the gripping device is thereby opened by the control cam, a force is applied against the inside of the gripper arm against the spring force. The spring force of the coil spring thereby not only serves in closing the gripping device but also in the frictional holding of the container. The spring force is therefore configured accordingly in terms of magnitude.

Particularly when the container is to be grasped at the mid-section, the gripping device must be suited to firmly holding the container in a specific, in particular upright position. The high rotational speed of transport devices having a plurality of gripping devices arranged in particular in a circle imparts acceleration on particularly heavy and/or filled containers which, due to the container's shape and/or fill, can vary along the longitudinal axis of the container and can thus exert differing strong forces on the gripping device due to this. A container can however also experience initial/final acceleration upon linear movement of the gripping device and thus exert forces on the gripping device. Therefore, gripping sections of the gripper arms which fit precisely to the mid-section of the container and/or grasp the container at different points of its mid-section along the longitudinal axis of the container by means of multiple gripping section gripper fingers are typically utilized. A pivoting of the container about its longitudinal axis can thus be suppressed or the container's position respectively stabilized during transport.

Disadvantages thereby result for the gripping device since only containers of a specific shape and size can be stably and securely grasped and transported. When differently shaped containers are to be transported, the gripping section needs to be adapted to the new shape. This can be achieved, inter alia, by new gripper arms, their gripper fingers accordingly configured for respectively different container mid-section diameters. Another alternative consists of only changing the gripper fingers. Nevertheless, the transport device with the gripping devices needs to be stopped and converted, whereby the retrofitting results in at least a partial interruption of operations and involves financial losses and costs.

The task of the present invention is thus that of advantageously further developing a gripper arm, a gripping device as well as a transport device of the type cited at the outset to the effect of providing a compact gripping device from a low number of components and enabling an independent adapting of the gripper arm to the shape of the container not requiring any external user action.

SUMMARY OF THE INVENTION

The invention solves this task by way of a gripper arm having the features disclosed herein. With regard to the gripping device, the invention solves the task by way of a gripping device having the features disclosed herein. With regard to the transport device, the invention solves the task by way of a transport device having the features disclosed herein.

The advantages and preferential embodiments specified with regard to the gripper arm apply analogously to both the griping device as well as the transport device and vice versa.

Specifically, the task to which the gripper arm is directed is solved by a gripper arm for a gripping device for gripping, guiding and holding in particular bottle-like containers. The gripper arm thereby exhibits a base body on which a gripping section is arranged.

The gripping section is thereby pivotably mounted about a pivot axis. The pivot axis is of substantially horizontal orientation. The gripping section is thereby pivotable both in and against a direction of pivoting.

Further explanations as to the general structure of a gripper arm for a gripping device are to be taken from e.g. DE 10 2014 111 564 A1, the contents of which are entirely incorporated herein by reference, which stems from the applicant, to which reference is insofar made at this point.

In addition, at least one limiting means and at least one resetting means is provided. The limiting means serves in limiting a pivoting range of the gripping section. The pivoting range can thereby be understood as a range limited by a maximum first deflection as viewed in the direction of pivoting through to a—counter to the direction of pivoting—maximum second deflection. In other words, the pivoting range is limited by a maximum deflection to the right and a maximum deflection to the left. The gripping section is infinitely pivotable within the pivoting range. Unless explicitly noted otherwise, the terms deflection and pivot are used synonymously here and in the following.

The resetting means thereby serves in the preferably automatic return of the pivoted gripping section into a vertical position. The vertical position can thereby be understood as an undeflected position of the gripping section, thus when it is oriented substantially upright.

The advantage of this gripper arm is, on the one hand, the pivotability of the gripping section enabling the stable and secure grasping and transporting of containers of different shapes and size. Adaptation to different container shapes and sizes is thereby enabled by the pivotable arrangement and bearing of the gripping section which can thus be infinitely adapted to the contour of the container.

On the other hand, the resetting means ensures that after releasing the container, the gripping section automatically pivots back into the vertical position; i.e. by itself, and can thus for example again accommodate containers for which the configured gripping section orientation is a non-pivoted state.

In one embodiment, the resetting means is designed as a pair of magnets comprising a first magnet and a second magnet. The first magnet is thereby arranged on the base body while the second magnet is arranged on the gripping section. The two magnets are designed as attracting magnets and thus enable a reliable return of the gripping section into the vertical position. When the gripping section is thus pivoted about the pivot axis, for example due to it grasping a container having a contour not able to be gripped by the non-pivoted gripper arm, the second magnet arranged on the gripping section then also pivots out along with it. However, the magnetic attractive force between the two magnets thereby always counteracts any resistance of the container being gripped. When the container is released, the magnetic attractive force of the two magnets thus ensures that the gripper arm returns to the vertical position.

The two magnets of the magnet pair are appropriately arranged so as to face each other when the gripping section is in the vertical position. The two magnets thus exert a maximum attractive force on one another and thereby ensure a reliable return of the gripping section.

Alternatively, the resetting means is designed as a spring element which exerts a spring force on the gripper arm so that it returns to the vertical position.

According to one preferential configuration, the at least one limiting means is designed as a banking pin. Furthermore, the gripping section according to this preferential configuration exhibits a limiter opening. The banking pin is thereby seated in the limiter opening, wherein an outer diameter of the banking pin, i.e. a banking pin thickness, is smaller than an inner diameter of the limiter opening. The difference in diameter thereby results in (bearing) clearance between the pin and the opening so that the pivoting range and thus a pivoting of the gripping section are realized by the pin resting against an inner wall of the limiter opening. The advantage here is thus being able to achieve a simple configuration to the limiting means.

The limiter opening is preferably of substantially round or kidney-shaped design, in particular as a type of a slotted guide. This likewise enables the realizing of a technically simple and at the same time reliable pivoting limitation.

In one embodiment, the at least one limiting means equally limits a maximum pivoting motion relative to the vertical position in and against the direction of pivoting. Meaning that the limiting means is configured such that the gripping section can be pivoted out of the vertical position to the same extent both in and against the direction of pivoting. In other words, the vertical position "divides" the pivoting range into two equally sized segments exactly down the middle.

Furthermore, the pivot axis according to one expedient, albeit not exclusive, embodiment runs centrically and symmetrically to the gripping section. Thus when gripping, the same leverage forces act on e.g. the gripper fingers, these thereby being loaded equally. Moreover, the center of gravity lies in the middle of the gripping section and allows the gripping section to pivot more easily or to remain in a rotational position advantageous to gripping the container.

The at least one limiting means and the at least one resetting means are arranged along an in particular perpendicularly oriented longitudinal axis. So doing ensures a precise return of the gripper arm into the vertical position on the one hand and an equal division of the pivoting range in and against the direction of pivoting out of the vertical position on the other hand.

In one embodiment, the gripping section is mounted onto a pivot pin of the base body and arranged pivotably and axially non-displaceably, although preferably reversibly, via a fixing means, for example a screw or rivet. The gripping section thereby forms a positive connection with the pivot pin. Axially non-displaceable can hereby be understood as the gripping section being mounted in stationary manner on the pivot pin once the fixing means is arranged and thus not being able to be pulled off the pivot pin. The pivot pin is instead only pivotable in and against the direction of pivoting when mounted. This thereby enables easy assembly as well as simple replacement of the gripper arm, e.g. upon damage.

According to one alternative configuration, the gripping section is mounted onto a pivot pin of the base body. Here, the gripping section forms a self-locking snap connection by way of a projection formed within it and a slot in the pivot pin. The gripping section thereby likewise forms a positive connection with the pivot pin. Additionally, the aforementioned projection yields the advantage of not needing to introduce additional external fixing means on which dust and dirt can accumulate. Moreover, the projection and the slot enable a stable, but also releasable fixing, respectively connection, and are rarely subject to wear. Alternative pivot pin embodiments are furthermore possible, e.g. as one-piece or two-piece nestable hollow cylinders.

In one further development of the inventive gripper arm, the gripping section is at least partly shaped like a fork. The gripper arm thereby exhibits at least two gripper fingers with which a container can be held in a gripping position. The fork-like form to the gripping section of at least two gripper fingers affords a stable gripping of the container, yet also a material savings compared to, for example, scooper-shaped gripping sections. Particularly in conjunction with the pivot axis, the gripping section with the gripper fingers can be angled or respectively pivoted toward the container, thus independently adapting to the shape of the container and holding the container more firmly.

In one embodiment, the gripping section is integrally formed; i.e. monolithic. By virtue of its one-piece design, the gripping section can thereby be replaced very quickly and economically.

Alternatively, or additionally thereto, the gripping section comprises a plastic, in particular a fiber-reinforced polyether ether ketone. The gripper arm in particular is made from such a plastic. Conventional gripper arms are made of stainless steel and are therefore relatively expensive, whereby it has moreover been shown that metallic gripper arms occasionally bend during the operation of the gripping devices in question, which is difficult to see during gripping device operation and can on the other hand lead to damaging the container to be gripped and transported and/or the oppositely disposed gripper arms which hand over and respectively take over the container and/or other fittings. When the gripper arms are made from plastic, however, they can be produced very inexpensively as disposable items via injection molding. Furthermore, plastic exhibits better properties for this application compared to stainless steel such that an overloading of the gripper arm does not result in bending but rather immediate breakage, this not entailing any consequential damage to the bottle and enabling instant identification of the overloaded gripper arm. Fiber-reinforced polyether ether ketone (PEEK) has proven to be an advantageous plastic as it exhibits good rigidity along with sufficient flexibility. PEEK is a high temperature-resistant thermoplastic polymer and the fiber reinforcement renders a fiber-plastic composite of high specific rigidity and stability. In contrast to commonly used metal/stainless steel, plastic shows barely any signs of wear when cleaned with water. A plastic-molded gripper arm yields an easily replaceable product which can be removed without difficulty and replaced without major cost or production time after wearing out.

The task to which the gripping device is directed is specifically solved by a gripping device for the gripping, holding and guiding of in particular bottle-like containers, wherein the gripping device has at least one gripper arm pair comprising a first gripper arm as well as a second gripper arm of complementary form to the first gripper arm. Both the first as well as the second gripper arm is specifically one of the gripper arms as described above.

The gripping device further comprises a bearing unit for supporting the pair of gripper arms. To that end, the bearing unit preferentially has two bearing pins for the pivotable arrangement of the first gripper arm and the second gripper arm.

The gripping device further comprises at least one closing means. The closing means serves an in particular automatic closing of the gripper arm pair from an open position into a gripping position. Preferentially used as the at least one closing means is a spring element, for example a torsion spring, or alternatively a pair of magnets.

According to one preferential configuration of the gripping device, the first gripper arm and the second gripper arm are in each case pivotable about a pivot axis relative to one another. This has the advantage of the gripping device also being able to be securely grip asymmetrically configured containers in terms of circumferential contour.

The task to which the transport device is directed is specifically solved by a transport device for gripping, holding and guiding in particular bottle-like containers, wherein at least one gripping device is arranged in a circumferential direction of the transport device. Preferentially, a plurality of gripping devices are arranged adjacent one another along the entire circumferential direction. The at least one gripping device is in particular the gripping device as described above. By virtue of this arrangement of gripping devices, the transport device is also referred to as a transport star.

Furthermore, the at least one gripping device is arranged such that the at least one gripper arm pair of the gripping device is directed radially outward.

BRIEF DESCRIPTION OF THE DRAWINGS

Example embodiments of the invention are described in greater detail below on the basis of the figures. These show, to some extent in highly simplified representations.

DETAILED DESCRIPTION OF THE INVENTION

Figure 1:
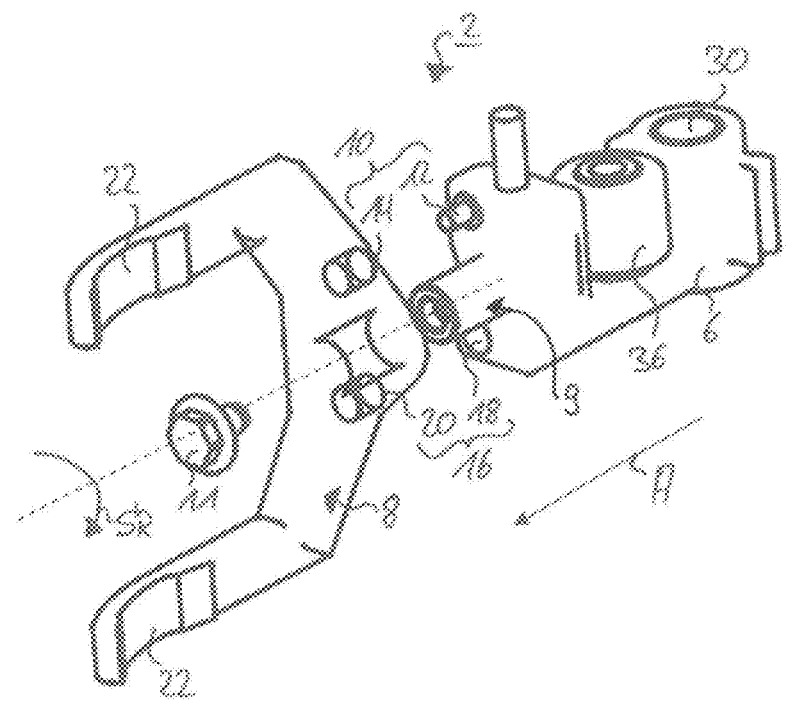
FIG. 1 is an exploded view of a gripper arm according to the invention.

In the figures, components rendering the same effect are always depicted with the same reference numerals.

FIG. 1 shows an exploded view of a gripper arm 2 for a gripping device 4 (cf. FIG. 2) for the gripping, holding and guiding of in particular bottle-like containers (not shown). The gripper arm 2 comprises a base body 6 and a gripping section 8 arranged on the base body 6. The gripping section 8 is thereby mounted so as to be pivotable about a pivot axis S in and against a direction of pivoting SR. That is to say that the gripping section 8 is pivotable in and against the direction of pivoting SE relative to the base body 6.

In order to realize the pivoting motion of the gripping section 8, same is mounted onto a pivot pin 9 of the base body 6 and arranged so as to be pivotable and non-displaceable in an axial direction A via a fixing means 11. In the exemplary embodiment according to FIG. 1, the fixing means 11 is configured as a screw.

Alternatively, the gripping section 8 can also be mounted onto the pivot pin 9 and thereby form a self-locking snap connection (not shown). To form the self-locking snap connection, a molded projection is then provided on the gripping section which forms the aforesaid self-locking snap connection with a slot in the pivot pin 9. Pivotability in and against the direction of pivoting SR is thereby not affected.

The gripping section 8 is integrally formed; i.e. monolithic, and comprises a plastic. The gripping section 8 is particularly formed from plastic. A fiber-reinforced polyether ether ketone (PEEK) is thereby preferably used as the plastic as it exhibits good rigidity along with sufficient flexibility.

The gripping section 8 is furthermore shaped like a fork in order to reliably grip the in particular bottle-like containers. To that end, the gripping section 8 exhibits at least two gripper fingers 22.

The gripper arm 2 comprises at least one limiting means 10. The limiting means 10 serves in the limitation of a pivoting range SB (cf. FIGS. 3B and 3C) of the gripping section 8. The at least one limiting means 10 is thereby designed as a banking pin 12 in the exemplary embodiment according to FIG. 1. The gripping section 8 further comprises a limiter opening 14 in which the limiting means 10, here the banking pin 12, is seated when the gripping section 8 is disposed on the pivot pin 9.

In order to reliably limit the pivoting motion in and against the direction of pivoting SR, an outer diameter of the limiting means 12 is smaller than an inner diameter of the limiter opening 14. This renders a (bearing) clearance of the banking pin 12 within the limiter opening 14 so that the banking pin 12 rests against a side wall of the limiter opening 14 in order to limit the pivoting motion of the gripping section 8. (cf. FIGS. 3B, 3C).

The limiter opening 14 in the exemplary embodiment is round. Alternatively, however, it can also be kidney-shaped as a type of a slotted guide.

Figure 3A:
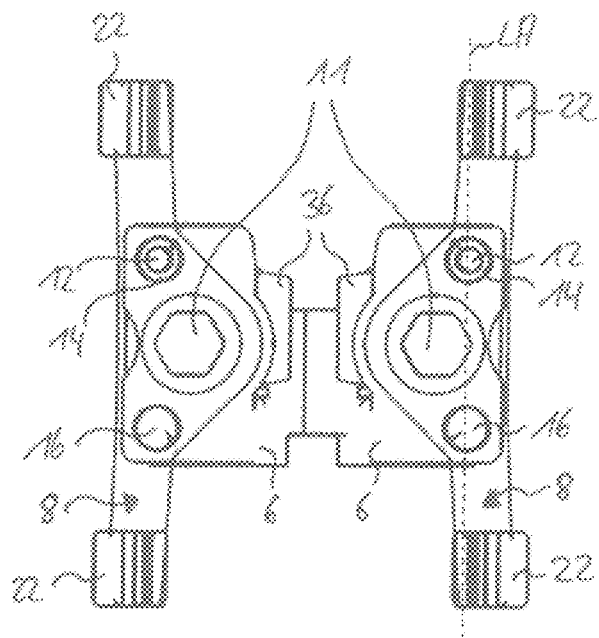
FIG. 3A is a frontal view of the gripping device with gripping sections situated in a vertical position.

At least one resetting means 16 is furthermore provided which serves in returning the pivoted gripping section 8 to a vertical position (cf. FIG. 3A).

In the exemplary embodiment according to FIG. 1, the resetting means 16 is designed as a pair of magnets having a first magnet 18 and a second magnet 20. The first magnet 18 is thereby arranged on and particularly in the base body 6. The first magnet 18 is thereby appropriately arranged on a side of the base body 6 facing the gripping section 8. The second magnet 20 is particularly arranged on, and specifically integrated into, a side of the gripping section 8 attaching to the base body 6.

To enable the return, the magnet pair 18, 20 is designed as an attracting magnet pair; i.e. the first magnet 18 and the second magnet 20 attract each other. Specifically, the first magnet 18 and the second magnet 20 are arranged so as to be exactly opposite each other when the gripping section 8 is in the vertical position. When the gripping section 8 is deflected in or against the direction of pivoting SR, the attractive force between the two magnets 18, 20 thus ensures that the gripping section 8 is drawn back into the vertical position again and thus reset.

Figure 2:
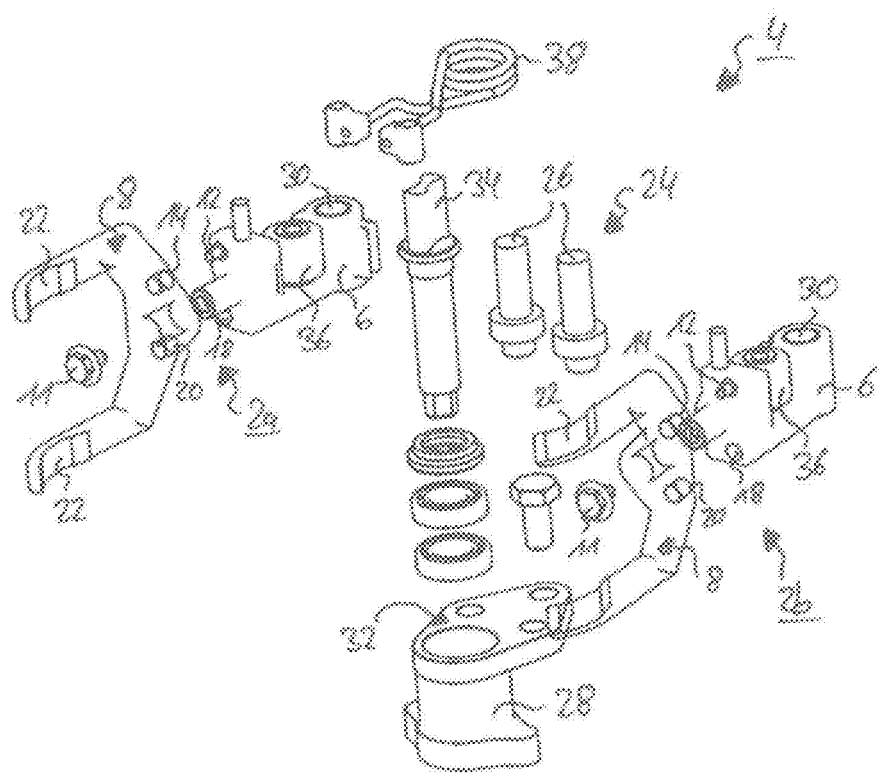
FIG. 2 is an exploded view of a gripping device according to the invention.

The FIG. 2 exploded view of an inventive gripping device 4 shows the essential components of such a gripping device 4. The gripping device 4 is likewise designed for the gripping, holding and guiding of in particular bottle-like containers and thereby exhibits at least one gripper arm pair comprising a first gripper arm 2a and a second gripper arm 2b. The second gripper arm 2b is of complementary design to the first gripper arm 2a. Both gripper arms 2a, 2b have a respective gripping section 8. The two gripper arms 2a, 2b are in each case preferentially the gripper arm 2 as noted above and described in FIG. 1.

The gripping device 4 furthermore has at least one bearing unit 24 which serves in supporting the gripper arm pair 2a, 2b. To that end, the bearing unit comprises two bearing pins 26 and a bearing body 28. The bearing pins 26 serve in accommodating the gripper arms 2 and especially the base body 6. To that end, the base bodies 6 each have a bore hole 30 serving to receive the bearing pins 26.

In an assembled state, the gripper arms 2 are then arranged on an upper side 32 of the bearing body 28. To move the gripper arm pair from a gripping position into an open position, a control cam 34 is provided which is operatively connected to at least one actuating roller 36 of each gripper arm 2.

To close the gripper arm pair from the open position into the gripping position, at least one closing means 38 is provided which in the exemplary embodiment according to FIG. 2 is configured as a spring and particularly as a torsion spring. Alternatively, the closing means 38 can also be configured as a pair of attracting magnets (cf. FIG. 4). When mounted, the closing means 38 is disposed such that it exerts a spring force on the gripper arm pair in the gripping position so as to pull same into the gripping position.

Both gripping sections 8 of the gripping device 4 shown in FIG. 2 are pivotably mounted about the pivot axis S in the manner already described above and specifically also designed to be pivotable relative to each other.

FIG. 3A shows a frontal view of the assembled gripping device 4. The gripping sections 8 are thereby in a vertical position, thus not deflected in or against the direction of pivoting SR. Also easy to see here is that the at least one limiting means 10 and the at least one resetting means 16 are arranged along a longitudinal axis LA. The banking pin 12 in this position of the gripping section 8 is preferentially situated centrically within the limiter opening 14, thus does not abut against an inner wall of the limiter opening 14.

Figure 3B:
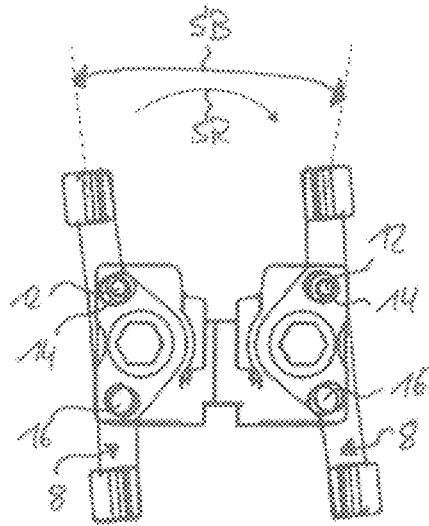
FIG. 3B is a frontal view of the gripping device with gripping sections pivoted outward by a maximum first deflection.

FIG. 3B shows a frontal view of the assembled gripping device in which both gripping sections 8 are deflected against the direction of pivoting SR by a maximum deflection (maximum first deflection). The maximum deflection against the direction of pivoting SR is thereby to be understood as a maximum deflection to the left (viewed in the image plane). To limit this deflection, the respective banking pin of the gripper arms abuts against a right inner wall of the limiter openings 14 as viewed in the image plane.

Figure 3C:
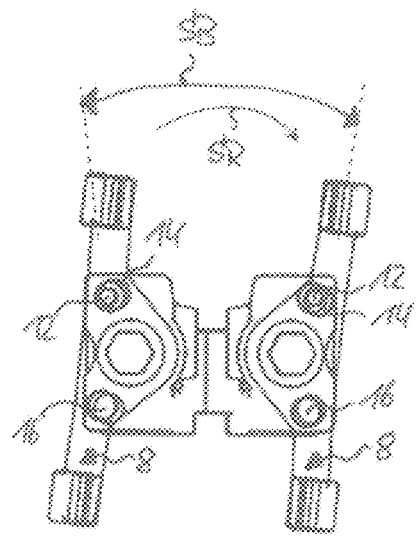
FIG. 3C is a frontal view of the gripping device with gripping sections pivoted outward by a maximum second deflection.

In similar fashion, FIG. 3C shows a frontal view of the assembled gripping device 4 with the two gripping sections 8 at a maximum deflection in the direction of pivoting SR (maximum second deflection). To limit this maximum second deflection, the banking pins 12 abut against a left inner wall of the limiter openings 14.

In addition thereto, as already mentioned above, it is also possible for both gripping sections 8 to be pivoted out relative to each other; i.e. one gripping section 8 to be for example pivoted out in the direction of pivoting SR and the respective other gripping section 8 concurrently pivoted out against the direction of pivoting SR.

Figure 4:
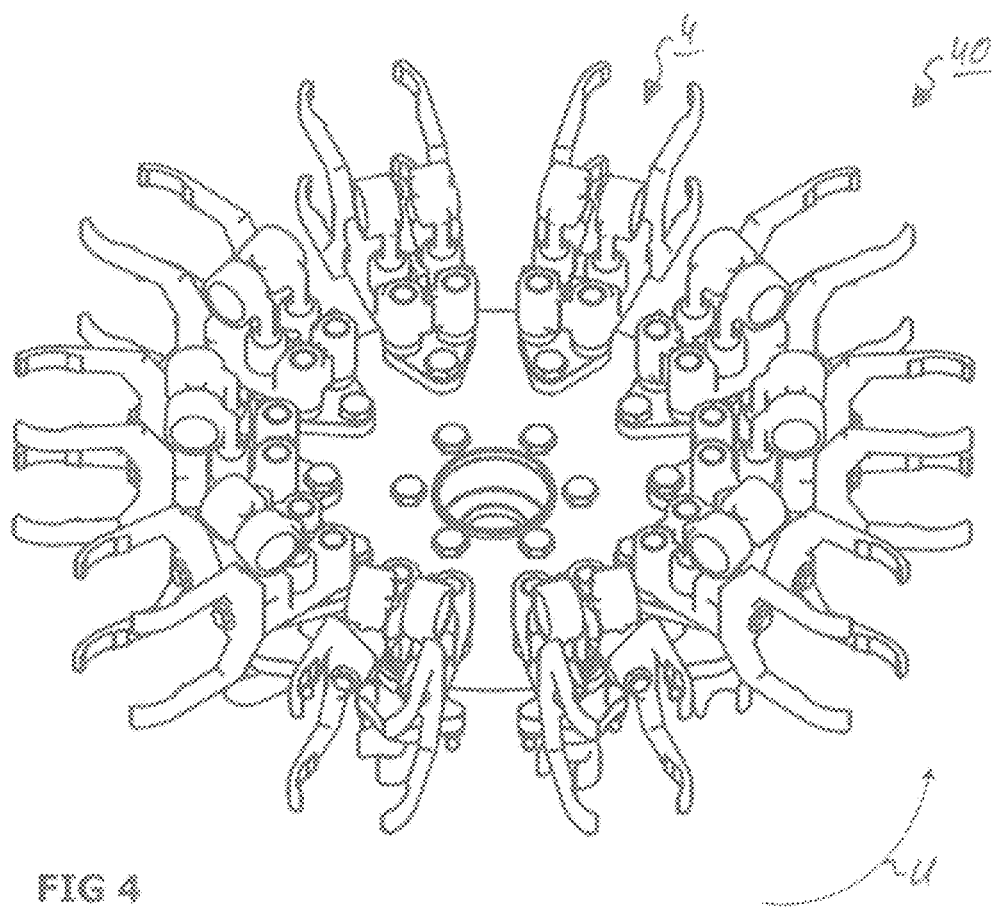
FIG. 4 is a perspective view of a transport device with gripping devices arranged thereon.

FIG. 4 shows a perspective view of a transport device 40 designed for the gripping, holding and guiding of in particular bottle-like containers. At least one, preferably multiple, and in the present embodiment ten gripping devices 4 of the type described above are thereby arranged in a circumferential direction U of the transport device 40. The gripping devices 4 are thereby arranged such that the gripper arm pairs and particularly the gripping sections 8 of the gripping devices 4 are each directed radially outward.

The gripping devices 4 of the transport device 40 in the exemplary embodiment according to FIG. 4 are likewise realized with the aforementioned alternative closing means 38. Meaning that the gripping devices 4 of the transport device 40 have an attracting pair of magnets as the closing means 38.

The invention is not limited to the exemplary embodiments described above. Rather, one skilled in the art can also derive other variants of the invention therefrom without departing from the subject matter of the invention. In particular, all the individual features described in conjunction with the exemplary embodiments can also be combined in other ways without departing from the subject matter of the invention.

LIST OF REFERENCE NUMERALS 2 gripper arm
4 gripping device
6 base body
8 gripping section
9 pivot pin
10 limiting means
11 fixing means
12 banking pin
14 limiter opening
16 resetting means
18 first magnet
20 second magnet
22 gripper finger
24 bearing unit
26 bearing pin
28 bearing body 30 bore hole
32 upper side
34 control cam
36 actuating roller
38 closing means
40 transport device
S pivot axis
SR direction of pivoting
SB pivoting range
A axial direction
LA longitudinal axis
U circumferential direction

What is claimed is:

1. A gripper arm for a gripping device for gripping, holding and guiding containers, the gripper arm comprising:
   a base body; and
   a gripping section arranged on the base body, wherein the gripping section is pivotably mounted about a pivot axis in and against a direction of pivoting, wherein at least one limiting means is provided for limiting a pivoting range of the gripping section and at least one resetting means is provided for returning the gripping section into a vertical position, wherein the pivot axis runs centrically and symmetrically to the gripping section.

2. The gripper arm according to claim 1, wherein the at least one resetting means is a pair of magnets comprising a first magnet and a second magnet, wherein the first magnet is arranged on the base body and the second magnet is arranged on the gripping section.

3. The gripper arm according to claim 1, wherein the at least one limiting means is a banking pin and the gripping section exhibits a limiter opening in which the at least one limiting means is seated, wherein an outer diameter of the at least one limiting means is smaller than an inner diameter of the limiter opening.

4. The gripper arm according to claim 3, wherein the limiter opening is substantially round or substantially kidney-shaped.

5. The gripper arm according to claim 3, wherein the limiter opening is a slotted guide.

6. The gripper arm according to claim 1, wherein the at least one limiting means equally limits a maximum pivoting motion of the gripping section relative to the vertical position in and against the direction of pivoting.

7. The gripper arm according to claim 1, wherein the gripping section is mounted onto a pivot pin of the base body and arranged to be pivotable and non-displaceable in an axial direction via a fixing means.

8. The gripper arm according to claim 1, wherein the gripping section is mounted onto a pivot pin of the base body and a projection formed on the gripping section thereby forms a self-locking snap connection with a slot in the pivot pin.

9. The gripper arm according to claim 1, wherein the gripping section is at least partly fork shaped.

10. The gripper arm according to claim 1, wherein the at least one limiting means and the at least one resetting means are arranged along a longitudinal axis.

11. The gripper arm according to claim 1, wherein the gripping section is integrally formed.

12. The gripper arm according to claim 1, wherein the gripping section further comprises a plastic.

13. The gripper arm according to claim 1, wherein the gripping section further comprises a fiber-reinforced polyether ether ketone.

14. A gripping device for gripping, holding and guiding containers, the gripping device comprising:
   at least one gripper arm pair of a first gripper arm and a second gripper arm of complementary form to the first gripper arm in accordance with claim 1, at least one bearing unit for supporting the at least one gripper arm pair;
   at least one closing means for closing the at least one gripper arm pair from an open position into a gripping position; and
   at least one opening means for opening the at least one gripper arm pair from the gripping position into the open position.

15. The gripping device according to claim 14, wherein the first gripper arm and the second gripper arm are in each case pivotable about a pivot axis relative to one another.

16. A transport device for gripping, holding and guiding bottle like containers, wherein at least one gripping device, according to claim 14, is arranged in a circumferential direction of the transport device such that the at least one gripper arm pair of the gripping device is directed radially outward.

17. A gripper arm for a gripping device for gripping, holding and guiding containers, the gripper arm comprising:
   a base body; and
   a gripping section arranged on the base body, wherein the gripping section is pivotably mounted about a pivot axis in and against a direction of pivoting, wherein at least one limiting means is provided for limiting a pivoting range of the gripping section and at least one resetting means is provided for returning the gripping section into a vertical position, wherein the gripping section is mounted onto a pivot pin of the base body and arranged to be pivotable and non-displaceable in an axial direction via a fixing means.

* * * * *